Patented Feb. 13, 1945

2,369,214

UNITED STATES PATENT OFFICE 2,369,214

METHOD OF PURIFYING BORON TRICHLORIDE

Hugh S. Cooper, Cleveland, Ohio, assignor of one-half to Frank H. Wilson, Cleveland, Ohio No Drawing. Application March 28, 1944, Serial No. 528,475

4 Claims. (Cl. 23—205)

This invention relates to chemical processes and more particularly to a process for producing substantially pure boron trichloride. An object of the invention is to provide an economically practical method of treating impure boron trichloride to purify the same. Another object is to produce substantially pure boron trichloride. Other objects will be apparent as the invention is more fully hereinafter disclosed.

In accordance with the above objects I have discovered that impure boron trichloride may be converted into substantially pure boron trichloride by condensing the same at temperatures approximating —10° C., separating the condensate from uncondensed gases, re-vaporizing the condensate and passing the vapors through a column of boron carbide heated to temperatures within the range 800–1000° C., re-condensing the vapors after passing through the column at temperatures approximating —10° C. and separating the condensate from the uncondensed gases associated therewith.

Boron trichloride ($BCl_3$) is a gas at ordinary temperatures, having a boiling point of about 18° C. It is prepared most conveniently by passing chlorine over mixtures of boron oxide and carbon heated to elevated temperatures approximating 1000 to 1200° C. The chloridizing reaction results in the formation of a relatively large volume of CO in accordance with the equation:

$$B_2O_3 + 3C + 6Cl = 2BCl_3 + 3CO$$

This reaction is exceedingly difficult to control or regulate in such manner as to substantially eliminate free chlorine from the effluent mixture of the gases $BCl_3$ and CO as well as variable amounts of $COCl_2$. On condensing this mixture of gases at temperatures approximating —10° C., the boron trichloride and the phosgene, which have closely similar boiling points, collect in the liquid phase and this liquid phase has a relatively high solubility for the free chlorine present in the gas mixture from which it is not readily removed by selective vaporization.

I have discovered, however, that by vaporizing this condensed mixture consisting principally of boron trichloride with associated impurities consisting in major part of chlorine and in minor part of phosgene and passing the vapor over boron carbide heated to 800 to 1000° C. the free chlorine and the chlorine content of the phosgene are converted substantially completely into boron trichloride with the result that the effluent gases consist of boron trichloride with only small amounts of carbon monoxide which on condensation produce boron trichloride having a purity closely approximating 100%.

In place of boron carbide I may employ a pre-sintered mixture of boron oxide and carbon in accordance with the invention of my co-pending application Serial No. 528,473 filed March 28, 1944, which application is assigned to the same party and in the same way as is the present application.

As one specific embodiment of the present invention but not as a limitation of the same the purification of the boron trichloride condensate product of the above identified application will be described.

By the practice of the invention of said co-pending application a boron trichloride condensate product from the effluent gases averaging 85% $BCl_3$ and 15% Cl with a minor fractional percentage of $COCl_2$ usually is obtained on condensing the gases at temperatures approximating —10° C. The $BCl_3$ content of this condensate may fall as low as 80% and may go as high as 93% depending upon the care with which the process is operated. For many purposes this mixture of gases ($BCl_3$ and Cl) is commercially satisfactory but for many other purposes substantially pure $BCl_3$ is desired.

To remove the associated free chlorine from this mixture of $BCl_3$ and Cl (in the liquid phase) the mixture is vaporized at temperatures approximating 30° C. and the vapors are circulated through a column of boron carbide heated to a temperature within the range 800 to 1000° C. to convert the chlorine content of the gas into $BCl_3$ in accordance with the following reaction:

$$B_4C + 12Cl = 4BCl_3 + C$$

Any phosgene present in the mixture of gases is broken up into CO and free chlorine at this high temperature with the chlorine content reacting in accordance with the above equation. The effluent gases consisting of $BCl_3$ and traces of CO and substantially no free chlorine may be condensed by any means heretofore utilized in the art to recover the substantially pure $BCl_3$ in the liquid phase.

The boron carbide employed in the above reaction should be substantially free of associated metal carbide impurities particularly those forming chloride compounds that are vaporizable at the temperature of operation.

In the practice of the above invention I have found it preferable to form a relatively high column of the boron carbide ($B_4C$) of relatively small cross-sectional area, using sized aggregates of the carbide that approximate ¼ inch in diameter thereby to obtain a substantially constant gas permeability factor in the column, the length of the column being limited with respect to the pressure of the $BCl_3 \cdot Cl$ gas mixture at 30° C. to obtain an economically practical rate of flow of $BCl_3$ through the column regulating the rate of flow with respect to the amount of chlorine present to obtain substantially complete conversion of the chlorine to boron trichloride before passing out of the top of the column. Various apparatus arrangements are utilizable in the practice of the present invention and the heighth and cross-section of the $B_4C$ column, as well as the particle size of the $B_4C$, may be widely varied without essential departure from the present invention. The temperature of heating (800 to 1000° C.) is readily obtained by direct or indirect heating means available in the art.

It is believed apparent that $BCl_3$ containing relatively large amounts of free chlorine and phosgene as impurities may be converted into substantially pure $BCl_3$ by the practice of the present invention and all modifications and adaptations of the above described invention are contemplated as may fall within the scope of the following claims:

What I claim is:

1. The method of removing free chlorine and phosgene from liquid boron trichloride containing the same which comprises passing the said boron trichloride in its vapor phase over and through boron carbide heated to a temperature within the range 800 to 1000° C.

2. The method of preparing substantially pure boron trichloride which comprises passing chlorine over and through a mixture of boron oxide and carbon heated to temperatures approximating 1000 to 1200° C., condensing the effluent gases to separate the boron trichloride therein from carbon monoxide, passing the condensate in the vapor phase over and through boron carbide heated to a temperature within the range 800 to 1000° C., and condensing the effluent gases to separate the boron trichloride from the remaining carbon monoxide.

3. In the manufacture of boron trichloride, the purification step which comprises passing impure boron trichloride containing free chlorine and phosgene over and through boron carbide heated to temperatures within the range 800 to 1000° C., thereby to convert the free chlorine and the chlorine content of the phosgene into boron trichloride.

4. In the manufacture of boron trichloride, the improvement which comprises condensing a mixture of gases consisting of $BCl_3$, CO, phosgene and Cl, at a temperature approximating $-10°$ C., separating the condensate from the uncondensed gases, re-vaporizing the condensate, passing the condensate vapors over and through boron carbide heated to 800 to 1000° C., re-condensing the effluent vapors at $-10°$ C., and separating the condensate from the uncondensed gases.

HUGH S. COOPER.